United States Patent Office 2,887,100
Patented May 19, 1959

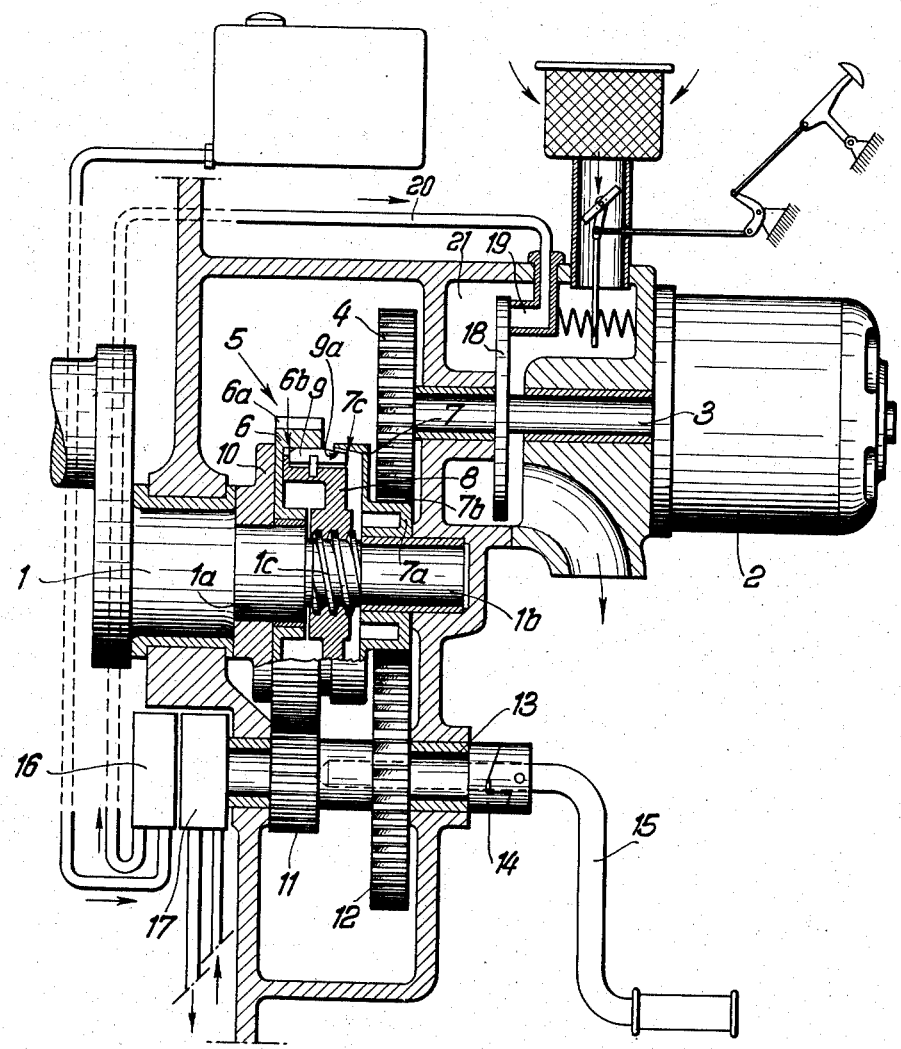

2,887,100

STARTING GEAR FOR INTERNAL COMBUSTION ENGINES

Hermann Papst, St. Georgen, Black Forest, Germany

Application March 22, 1954, Serial No. 417,775

Claims priority, application Germany March 27, 1953

6 Claims. (Cl. 123—179)

This invention relates to starting gear for internal combustion engines which is provided with a reduction gearing and with two alternatively operating clutches. In a gear of this type one of the clutches establishes, during starting, an indirect connection of the gear with the crankshaft of the internal combustion engine via the reduction gearing, while the other clutch after starting, resp. after acceleration of the internal combustion engine establishes a direct connection between the gear shaft and the crankshaft.

It is an object of the invention to make use of the possibilities offered by the starting gear, for effecting immediate and accelerated operation, upon starting of the internal combustion engine, of those engine accessories which are normally driven by the running engine, in order to facilitate starting of the internal combustion engine and/or improve the oil supply during the starting period.

Consequently the invention resides in the fact, that in an internal combustion engine having a starting gear of the type mentioned above, the engine accessories normally driven by the running internal combustion engine and assuring the supply of fuel, oil, etc., are connected with the starting gear in order to impart an accelerated drive to them during starting. The invention recommends that the drive be taken off the reduction gearing which runs at high speed during starting; this also permits a very compact yet accessible arrangement of the engine accessories.

For internal combustion engines equipped with a carburetor the invention recommends the use of a carburetor having a rotating fuel extractor disc and hollow outlet of the fuel supply line, the arrangement being such that the outlet of the fuel supply line bears against the fuel extractor disc and is closed by the latter. According to the invention the fuel extractor disc of such a carburetor is connected to the starting gear, so that the speed of the fuel extractor disc during starting of the internal combustion engine is higher and the amount of fuel carburated is greater than would be the case if the fuel extractor disc were connected with the crankshaft of the internal combustion engine.

The invention further proposes to provide the shaft of the reduction gearing with a dog clutch or the like, which permits a manually operable starting crank to be connected with it.

The invention will now be described in more detail in connection with an illustrative embodiment given by way of example only and with reference to the accompanying drawing.

The crankshaft 1 of an internal combustion engine (not shown) is adapted to be drivingly connected with an electric machine 2 via a shaft 3, a gear 4, and gearing 5, in such a manner, that the electric machine 2 may be used as a starter motor for starting the internal combustion engine, and at increased speed of the latter serves as a generator.

The gearing 5 is mounted on an extension of the crankshaft 1, which consists of two stepped portions $1a$ and $1b$, between which is provided a steep pitch thread $1c$. The gearing comprises a gearing disc 6 associated with the internal combustion engine, a gearing disc 7 associated with the electric machine 2, and a clutch nut 8, carrying an open resp. slotted expander ring 9.

The gearing disc 6 is mounted freely rotatable on the shaft portion $1a$, and is adapted to form a friction clutch together with the disc 10 which is rotationally fast with the shaft portion $1a$. On its periphery the gearing disc 6 is provided with teeth $6a$. The gearing disc 7 is mounted freely rotatable on the portion $1b$ of the crankshaft. On the hub portion $7a$ the gearing disc 7 is provided with teeth $7b$. The clutch nut 8, which is arranged between the two gearing discs 6 and 7, is in engagement with the steep pitch thread $1c$, by means of which the axial displacements required for the switching action are imparted to it. In the drawing, the clutch nut 8 is shown in its extreme left-hand position, so that the ring 9 assumes its expanded position and bears against the cylindrical surface $6b$ of the gearing disc 6. The cooperating surfaces $7c$ and $9a$ of the gearing disc 7 and the expander ring 9, respectively, are of conical form and enter into engagement with each other when the clutch nut 8 is displaced towards the right. Thereby the ring 9 is contracted and consequently is withdrawn from the surface $6b$ of the gearing disc 6.

A pinion 11 engages with the toothing $6a$ of the gearing disc 6, while a gear 12 is associated with the toothing $7b$ of the gearing disc 7. The pinion 11 and the gear 12 are arranged on a common hub and are rotatably supported on the countershaft 13.

The gearing interconnecting shaft 3 of the starter generator 2 and the engine shaft is, in effect, a gear train which includes gear 4 which may be termed the initial gear, gear $7b$ which may be termed an intermediate gear, gearing on shaft 13 which includes gears 11 and 12 and gear 6 which may be termed a terminal gear.

The gearing according to the invention operates as follows:

When it is desired to start the internal combustion engine, the electric machine 2 which is now connected to act as a motor, is put into operation and imparts a rotary motion to the gearing disk 6 via the gear 4, the toothing $7b$, the reduction gearing assembly 11—13, and the toothing $6a$. The disc 6, through the intermediary of the ring 9, imparts a rotary drive to the clutch nut 8, which, due to its engagement with the steep pitch thread $1c$, is displaced axially towards the left, pressing the gearing disc 6 against the disc 10, so that the discs 6 and 10 enter into frictional engagement and a rotary drive is imparted to the crankshaft 1. The reduction provided by the reduction gearing is so chosen, that during idling of the internal combustion engine the clutch nut 8 remains in the position shown in the drawing without, however, being able to exert a strong axial pressure on the gearing disc 6.

Upon acceleration of the internal combustion engine above idling speed the steep pitch thread $1c$ effects a displacement of the clutch nut 8 towards the right, so that the ring 9 and the gearing disc 7 enter into engagement with their conical surfaces $9a$ and $7c$, respectively, and the ring 9, due to its contraction, is withdrawn from the surface $6b$ of the gearing disc 6. Consequently, the rotation of the crankshaft 1 is transmitted to the electric machine 2 via the gearing disc 7 and the gear 4, the electric machine having meanwhile been switched to operate as a generator and being now adapted to produce electric current.

On its right end the countershaft 13 is provided with a dog clutch 14 or the like, in which may be inserted a hand crank 15 for the purpose of starting the internal combustion engine. To the rear extension of the countershaft 13 are connected a fuel pump 16 and an oil pump 17 which during starting are driven by the electric machine 2, but otherwise receive their drive from the running internal combustion engine. Due to the drive being imparted by the machine 2, operating as a starter motor, the oil supply of the internal combustion engine through the pump 17 and the fuel supply effected through the pump 16 are increased.

On the shaft 3 is mounted a disc 18 which constitutes the distributing member of a carburetor unit. The outlet 19 of the fuel supply line 20 bears against the disc 18 in such a manner, that the fuel inlet opening into the carburetor chamber 21 is closed when the disc 18 is at a standstill. When the disc 18 is rotating, the fuel is taken out of the fuel supply line in the form of a thin film by means of the disc, and is introduced into the carburetor chamber 21.

It will be understood that the invention is not limited to the gearing described and illustrated. The invention may be applied to any starting gear which comprises a reduction gearing and two alternatively operating clutches. The clutches may be of any suitable construction.

I claim:

1. In combination, an engine having a shaft, an electric motor starter and generator unit having a shaft, a gear train which includes an initial gear on said starter generator shaft, an intermediate gear, gearing mounted on a third shaft, and a terminal gear mounted for free rotation relative to said engine shaft, said intermediate gear also being mounted for free rotation relative to said engine shaft, clutch means operable responsively to turning of said initial gear by said starter generator unit when said engine is idle to establish a driving connection between said terminal gear and said engine shaft, whereby to turn said engine over for starting the same, the gears forming said gear train having ratios predetermined so that said third shaft is rotated at a high rate relative to the rate of said engine shaft when the latter is driven by said terminal gear, engine accessory means operably connected to said third shaft so that their rate of operation is relatively high as compared to the driven rate of said engine during a start, said clutch means being operable to release said driving connection between said terminal gear and engine shaft and to establish a driving connection between said engine shaft and said intermediate gear responsively to increased rate of rotation of said engine shaft relative to that of said starter generator shaft after said engine starts, whereby said engine then drives said starter generator and said gearing on said third shaft through said intermediate gear, said intermediate gear and said gearing having ratios predetermined so that said third shaft is rotated at a lower rate relative to the rate of said engine shaft when said third shaft is driven by said engine shaft, whereby said engine accessory means is operated at a relatively lower rate when said engine is operating than when it is being started.

2. The combination defined in claim 1 wherein said intermediate gear has a diameter smaller than that of said initial gear, said gearing on said third shaft including a gear engaged by said intermediate gear and having a diameter greater than that of said initial gear, said gearing also including a gear on said third shaft engaging said terminal gear, said terminal gear having a diameter at least as great as said gear on said third shaft engaged therewith.

3. The combination defined in claim 2 wherein said terminal gear has a diameter greater than the diameter of said gear on said third shaft engaged therewith.

4. The combination defined in claim 1 wherein said engine accessory means comprises a fuel pump.

5. The combination defined in claim 1 wherein said engine accessory means comprises a pump for lubricant.

6. The combination defined in claim 1 wherein said engine accessory means comprises a fuel pump and a pump for lubricant.

References Cited in the file of this patent

UNITED STATES PATENTS

| | | |
|---|---|---|
| 1,219,630 | Dean | Mar. 20, 1917 |
| 2,466,461 | Maurie et al. | Apr. 5, 1949 |
| 2,487,460 | Maurie | Nov. 8, 1949 |